Nov. 7, 1933.     W. EVERSON     1,934,298
SEEDING MACHINE
Filed Feb. 18, 1929     6 Sheets-Sheet 4
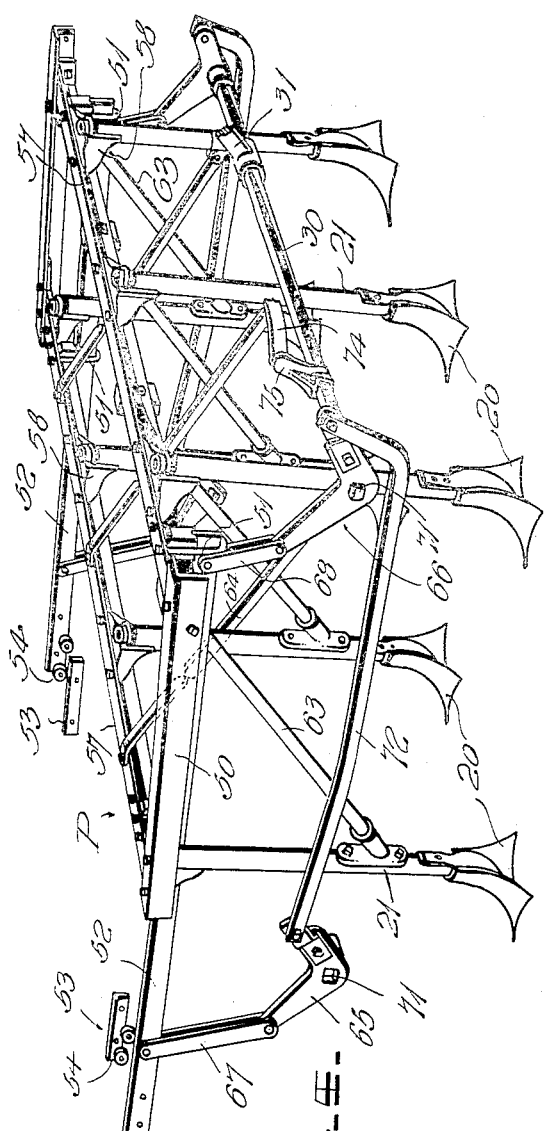
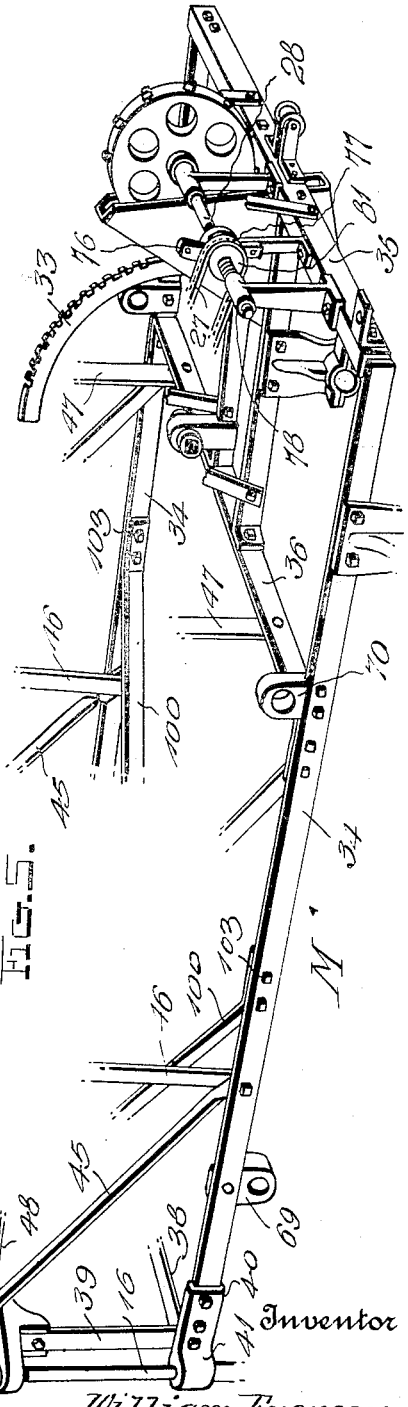
Witness
H. Woodard
Inventor
William Everson
By H. B. Wilson &co
Attorneys

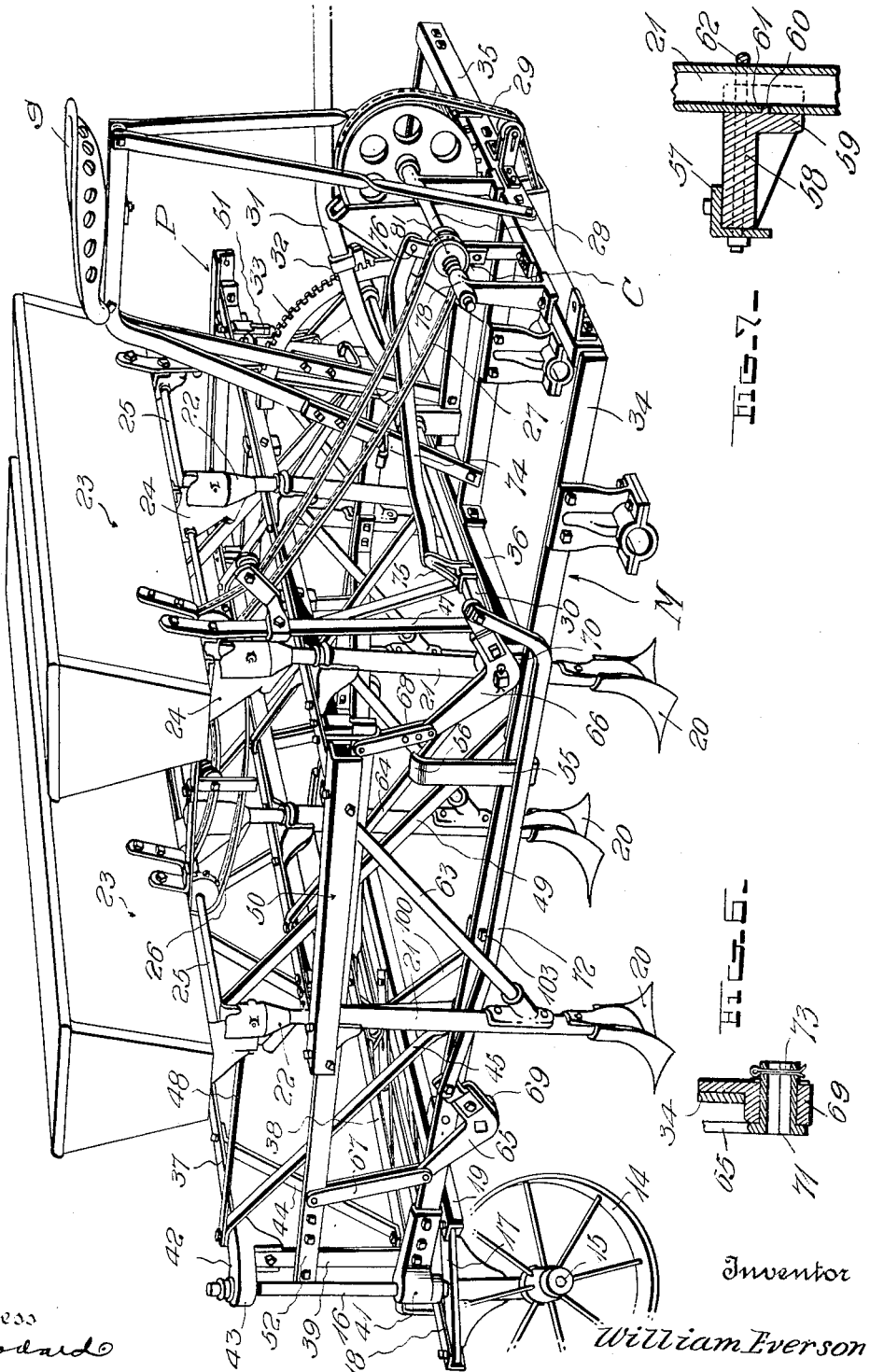

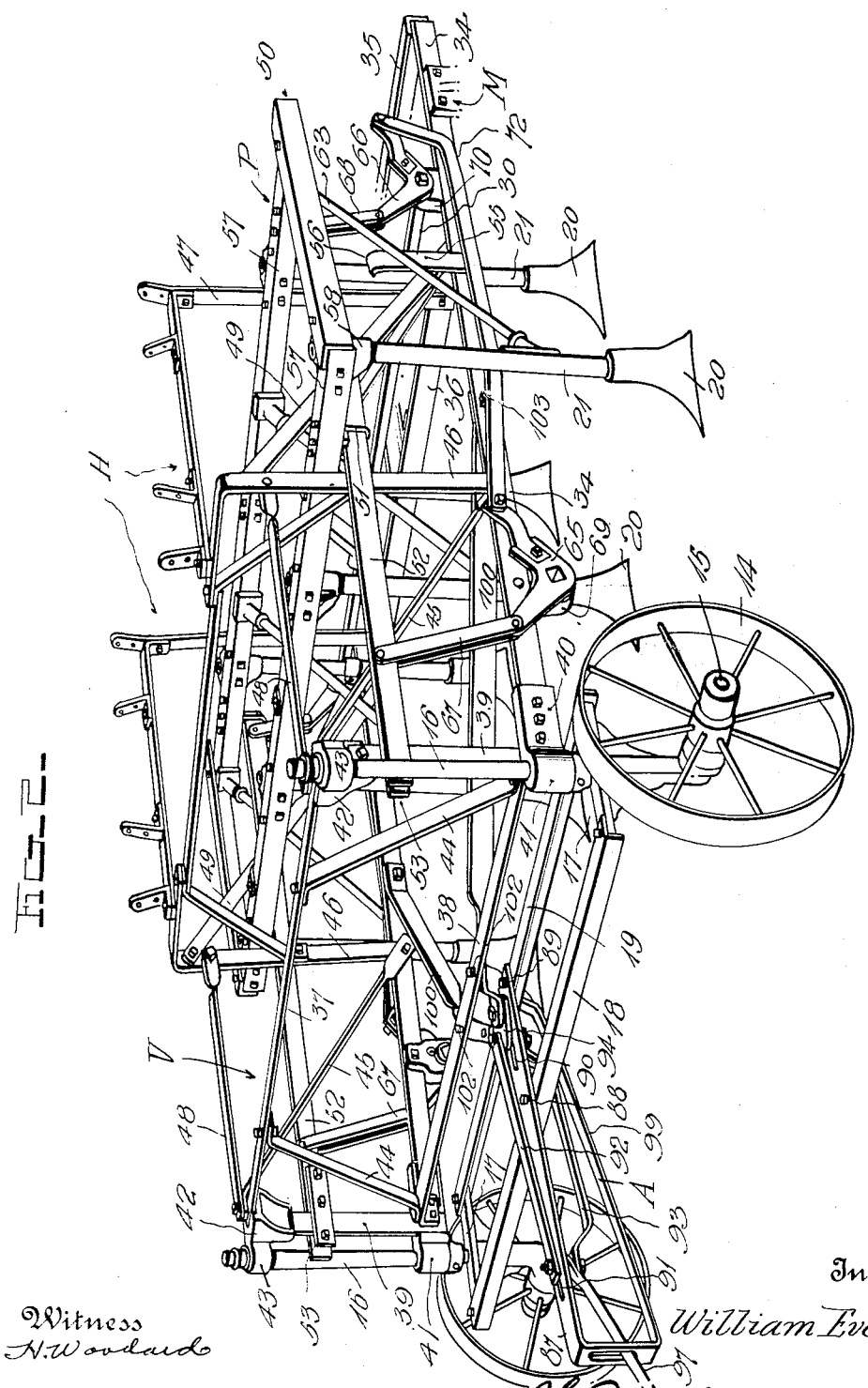

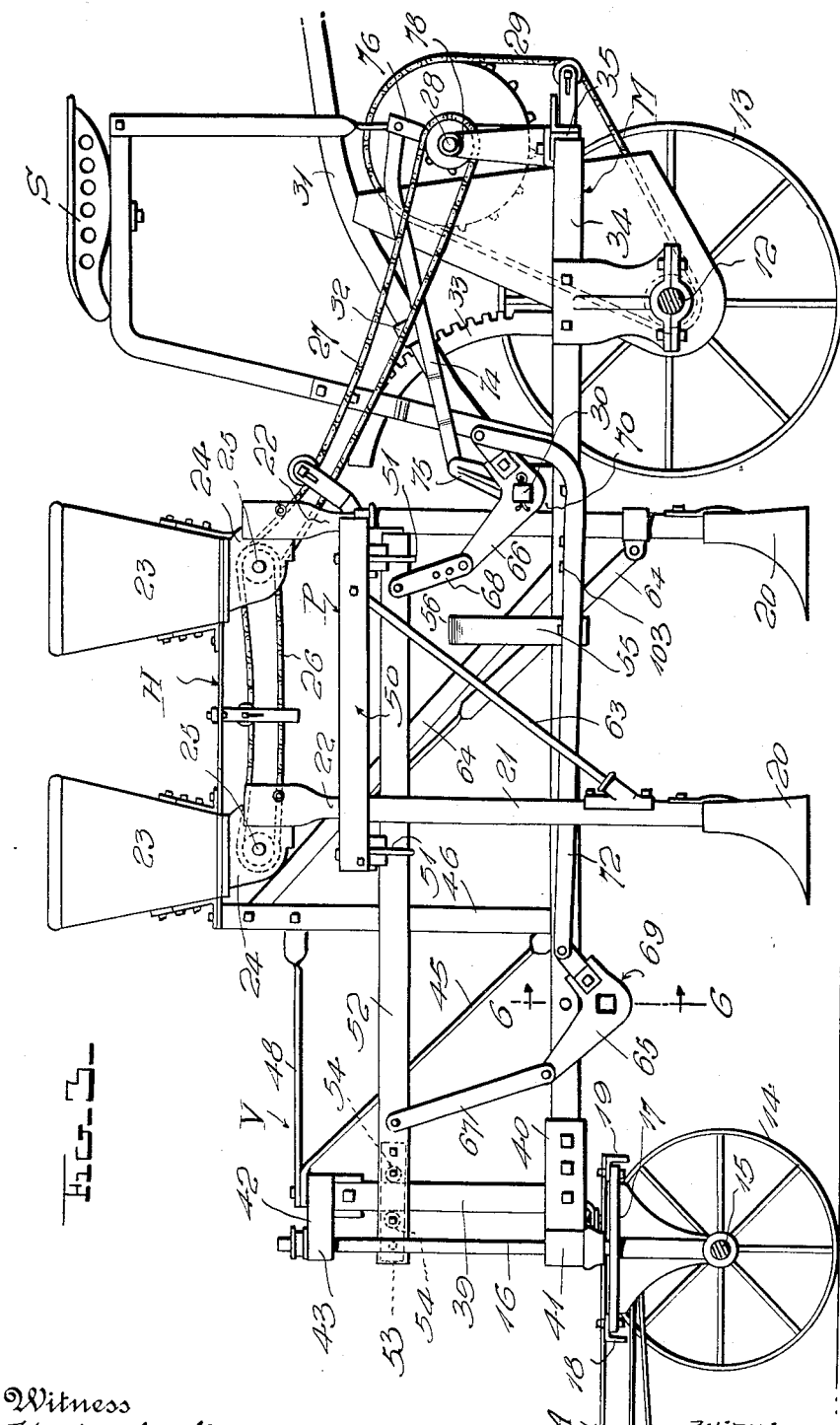

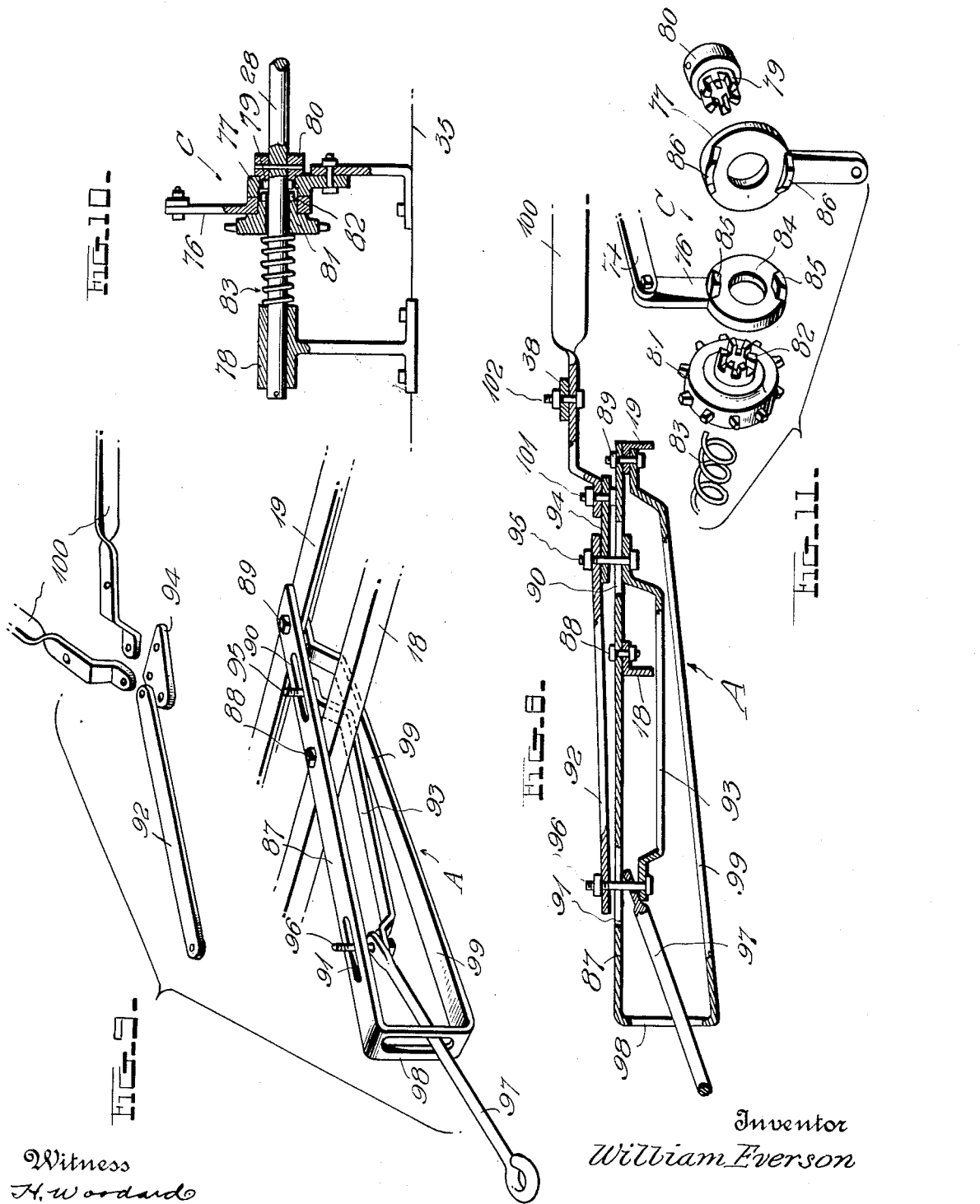

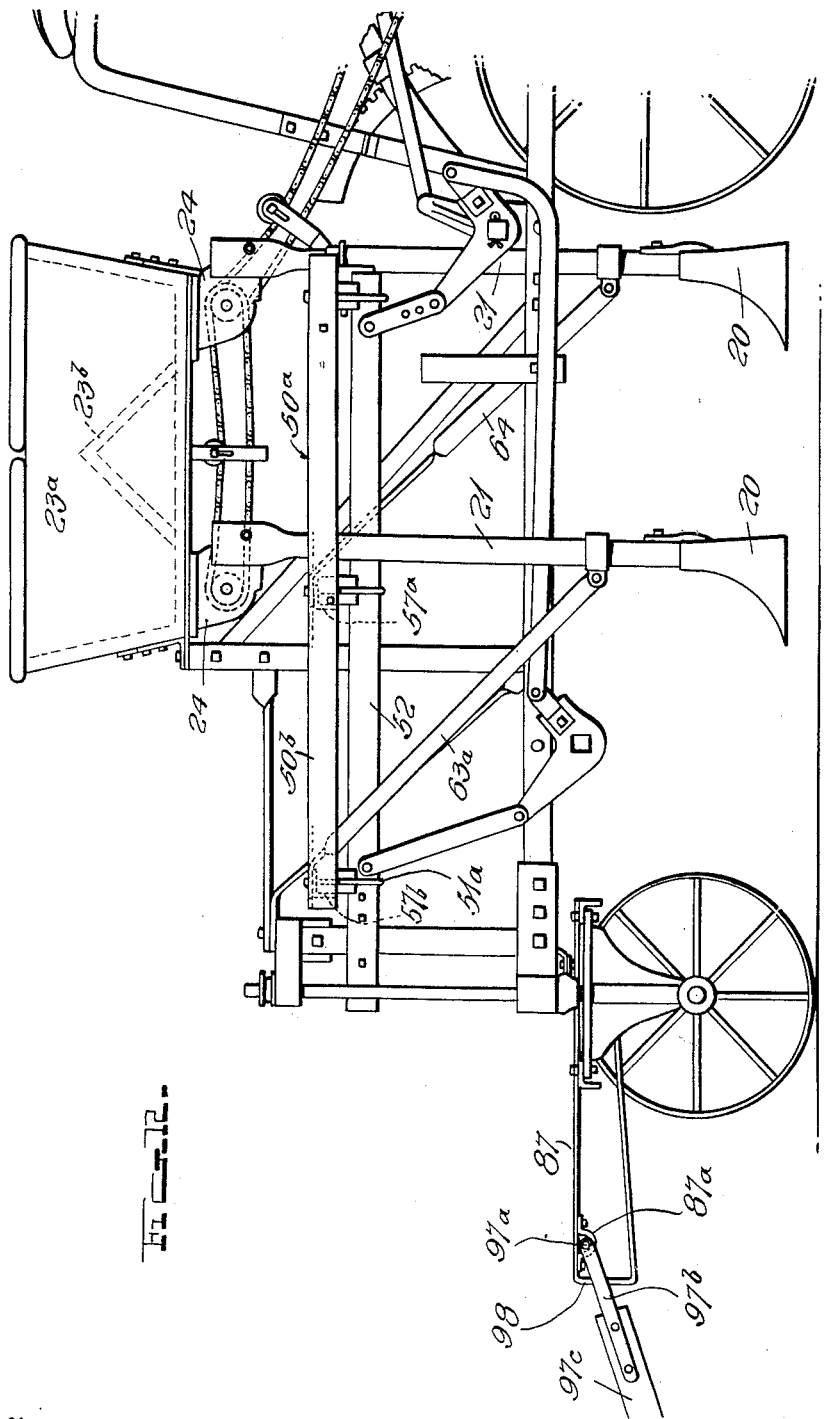

Patented Nov. 7, 1933

1,934,298

UNITED STATES PATENT OFFICE 1,934,298

SEEDING MACHINE

William Everson, Alma, Nebr., assignor to The Everson Company, Fort Collins, Colo.

Application February 18, 1929. Serial No. 340,868

11 Claims. (Cl. 111—52)

The invention relates to improvements in agricultural machines for seeding purposes, embodying a plurality of earth-splitting or furrow-opening plows and an elevated hopper provided with means for dropping seed through tubes into the furrow while the latter are held open by the plows, means for scattering or broadcasting the seed beneath the plows, double packing wheels being provided behind the plows to insure settling of the earth onto the dropped seed, and leaving an oval-shaped bottom to assure against season checking of the soil from any cause. One aim of the invention is to provide a new and improved structure in which the seed hopper remains stationary instead of being raised and lowered with the plows, thereby relieving the operator of lifting excessive weight when withdrawing said plows from the ground.

A further aim is to provide a novel frame structure for supporting the plows and seed tubes and to make unique provision to prevent excessive lateral lashing or other movement of said plows and tubes when either raised or lowered.

Another object is to provide a unique construction in which both the front and rear plows are uniformly raised and lowered and their lower portions always maintained in parallel relation with the surface of the ground, thereby insuring the formation of flat bottomed furrows of uniform depth regardless of the positions at which said plows be set, that is for either deep or shallow planting.

In the manufacture of agricultural machines for present-day use, provision must be made whereby they may be either horse-drawn or tractor-drawn. Hence, it is a further aim of the invention to provide a machine which may be effectively drawn in either way, and in carrying out this end, it is a further object to provide a structure which may be quickly and easily changed to locate an operating shaft for the plow-raising and lowering means either at the rear of the machine when it is to be drawn by horses, or at the front of said machine when the latter is to be tractor-drawn.

Another object is to make provision for the optional use of horse evener and tongue or tractor draw-bar without material change or alteration of the machine as herein outlined.

Yet another object is to provide a novel construction and arrangement of parts whereby a driving clutch for the seed dropping means is automatically thrown out of play when the plows are raised from the earth but is again engaged upon lowering of said plows.

A still further aim is the provision of a unique stub-tongue and hitch assembly which is such that the tractor cannot "ride" upon the front of the seeding machine when the latter is being tractor pulled, and which will carry the evener and tongue for horse-drawn implements, said stub-tongue and hitch assembly having a unique relation with steering means for the machine but being so arranged that all pull is exerted directly on the main frame structure instead of on any parts of the steering gear.

With the foregoing and minor objects in view, the invention resides in the novel subject matter hereinafter described and claimed, description being accomplished by reference to the accompanying drawings.

Fig. 1 is a perspective view, the rear axle and wheels being omitted.

Fig. 2 is a view similar to Fig. 1 looking in a different direction and omitting also the seed hoppers and associated parts.

Fig. 3 is a side elevation partly broken away and in section.

Fig. 4 is a perspective view of the plows, the lower sections of the seed discharge tubes, the vertically movable frame which carries these parts, and certain of the raising and lowering means for said frame.

Fig. 5 is a fragmentary perspective view showing the major portion of the main frame and more clearly illustrating the points at which the supporting legs of the hopper-carrying frame, are connected with said main frame.

Fig. 6 is a detail vertical sectional view on line 6—6 of Fig. 3 illustrating the manner in which the raising and lowering cranks for the plow-carrying frame, are mounted upon the main frame.

Fig. 7 is a detail vertical sectional view showing the manner of securing the lower sections of the seed discharge tubes to the frame which carries these tube sections and the plows.

Fig. 8 is a central vertical longitudinal sectional view through the stub-tongue and hitch assembly.

Fig. 9 is a disassembled perspective view of the parts shown in Fig. 8.

Fig. 10 is a vertical sectional view through the clutch mechanism.

Fig. 11 is a perspective view of the clutch parts shown in Fig. 10.

Fig. 12 is a view similar to Fig. 3 but showing some slight variations in construction.

The drawings above briefly described illustrate a construction which has proven advantageous from all standpoints of manufacture and use, and while this construction will be herein specifically explained, it is to be understood that within the scope of the invention as claimed, numerous variations may be made.

The machine embodies a main frame M supported at its rear end by a live axle 12 and pairs of earth-packing wheels 13, at least some of which serve to drive said axle. This main frame is supported at its front end by wheels 14 mounted upon spindles 15 whose inner ends are provided with upstanding shafts 16 mounted in a manner hereinafter described. The shafts 16 are provided with steering arms 17 connected by front and rear transverse steering bars 18—19, with which the novel stub-tongue and hitch assembly A, is associated.

The main frame M is provided with an elevated hopper-carrying frame H upon which may be mounted two independent hoppers 23 or a dual feed hopper 23ª as in Fig. 12, and interposed between the hoppers and said main frame, is a frame P for carrying the plows 20 and lower tube sections 21 to which said plows are secured, the upper ends of said tube sections 21 being telescopically engaged with flexible tube sections 22 which are connected with the seed outlets of the hoppers 23 or those of the dual feed hopper 23ª upon the hopper-carrying frame H, seed dropping mechanisms communicating with the tube sections 22 being of course provided. As the construction of these dropping mechanisms forms no part of the present invention, they are not illustrated in detail. Parts of their casing structures however, are denoted at 24 and their drive shafts are shown at 25, said shafts being connected by a chain 26 and sprockets. The rearmost of the shafts 24 is driven by a chain 27 from a rotary shaft 28 on the rear end of the frame M, through the instrumentality of a clutch C which will be hereinafter described. A chain 29 and appropriate sprockets are employed for connecting the shaft 28 with the axle 12 so that the latter continuously drives the former.

Raising and lowering means are provided for the frame P, controlled by a preferably square rock shaft 30 having a hand lever 31 which may be locked in adjusted position by a pawl 32 and rack 33. This shaft is shown at the rear of the machine near the driver's seat S and it will remain at this location if the machine is to be horse-drawn.

The main frame M embodies parallel longitudinal side bars 34 connected at their rear ends by a transverse bar 35, connected near said rear ends by a second transverse bar 36 and connected at their front ends by a transversely disposed vertical frame V. This vertical frame is of rectangular form and for future reference, its top, bottom and vertical side bars are given the numbers 37—38—39 respectively. The lower corners of this frame are rigidly secured to the front ends of the side bars 34 and to attaching portions 40 of bearings 41 through which the above mentioned shafts 16 pass. The upper corners of the frame V are formed by castings 42 which embody upper bearings 43 for said shafts 16. The upper portion of frame V is braced to its lower portion by appropriate braces 44, and similar braces 45 decline rearwardly from said upper portion of the frame V to the side bars 34 of the main frame.

The hopper-carrying frame H is shown quite clearly in Fig. 2 and while most features of this frame may be of any desired construction, I wish to draw attention to the fact that it is provided with two vertical front legs 46 secured to the side bars 34 of the frame M, and with two vertical rear legs 47 secured to the transverse bar 36 of said frame M. I also invite attention to the fact that the front portion of the frame H is connected with the upper corners of the frame V by suitable ties 48. Then too, I prefer to brace the legs 46 by inclined braces 49 extending therefrom to the side bars 34.

The frame P embodies a horizontally elongated rectangular frame portion 50 secured by appropriate clamps 51 upon two longitudinal bars 52. The front ends of these bars lie against the outer sides of the vertical side bars 39 of the front frame V, and by means of guides 53 preferably embodying rollers 54, said front ends of the bars 52 are connected with said bars 39 so that they may slide vertically along the latter. The bars 52 are disposed laterally of the front legs 46 of the hopper frame H and hence when the plow frame P is raised, said legs 46 form stops to limit the lateral play of said frame P, so that excessive lashing of the latter cannot take place. To prevent lateral shifting of this frame P when it is lowered, two rigid upstanding posts 55 are secured to the side bars 34 of the main frame M to lie against the inner sides of the bars 52, the upper ends 56 of said posts being inclined to facilitate engagement of said bars 52 with said posts upon lowering of the frame P.

The elongated rectangular portion 50 of the frame P passes between the front and rear legs 46—47 of the hopper frame H and embodies front and rear transverse bars 57 to which appropriate castings 58 are secured for effecting attachment of the tube sections 21. Each casting 58 is provided with a seat 59 for the tube section 21 and is formed in said seat with a projection 60 for reception in an opening 61 in said tube section as shown in Fig. 7, said tube section being held in the seat by a U-bolt or the like 62. This construction rigidly anchors the upper end of the tube section 21, and the stud 60 and opening 61 hold it against vertical shifting and lateral twisting. The lower ends of these tube sections may be braced by any desired means such as indicated at 63 and 64.

Front and rear sets of raising and lowering cranks 65—66 are mounted on the frame M and are connected by links 67—68 with the front and rear portions respectively of the bars 52. The front cranks 65 are mounted in bearings 69 secured to the side bars 34 (see Fig. 6), and the rear cranks 66 are similarly mounted in bearings 70 secured to said bars 34. These bearings 69—70 are shown to some extent in Figs. 1 and 2, but are fully illustrated in Fig. 5, and as above mentioned, reference may be had to Fig. 6 for the exact mounting of the cranks 65, the rear cranks 66 being mounted in the same way. It will be seen from this view and others that each of the cranks 65—66 is formed with a hub through which a preferably square opening 71 extends. The shaft 30 is shown occupying these openings of the rear cranks 66 and it is so positioned when it is convenient to manipulate the lever 31 of said shaft from the rear of the machine. Longitudinal links 72 connect the front and rear sets of cranks 65—66, so that they must move in unison, regardless of which set is directly operated by the shaft 30. Cotter pins such as 73 of Fig. 6 serve to hold the hubs of the cranks 65—66 within the bearings 69—70 and it will be obvious that these pins must pass also through openings in the shaft 30, so that the later is held against endwise movement.

A longitudinal link 74 is shown pivoted at its front end to an arm 75 on the shaft 30 and also pivoted to a controlling arm 76 for the clutch C. Rocking of shaft 30 in a direction to raise the ploys, throws the clutch out of action and consequently stops the dropping of seed through the tubes 21—22. Lowering of the plows by turning of the shaft in the other direction however, causes re-engagement of the clutch to drive the seed-dropping means. When the shaft 30 is disposed at the front of the machine, a longer link must be substituted for link 34 or the latter may be coupled to another link section to extend forwardly from it.

The clutch C is preferably of the construction detailed in Figs. 10 and 11, to which views reference is now made. A bearing 77 is fixedly mounted in any preferred manner upon the rear bar 33 of the main frame M, in line with one of the supporting bearings 78 for the shaft 28. This shaft 28 passes loosely through the bearing 77 but a toothed end 79 on a collar 80 which is secured to said shaft 28, is rotatably received in said bearing 77. A sprocket 81 which is engaged by the chain 27 is slidable upon the shaft 28 and is provided with a toothed hub 82, said sprocket being urged toward the collar 80 by a coiled spring 83. The inner end of the arm 76 is provided with an opening 84 through which the hub 82 passes rotatably, and said arm 76 is provided with cams 85 which are co-operable with additional cams 86 on the bearing 77, in either permitting engagement of the toothed hub 82 with the toothed collar 80, or in preventing such engagement. When arm 76 is moved in one direction, the cams 85 ride from the cams 86 and spring 83 engages the toothed hub 82 with the toothed collar 80 so that the shaft 28 then drives the sprocket 81. Swinging of arm 76 in the opposite direction however, causes the cams 85 to ride upon the cams 86, thereby forcing arm 76 laterally and causing it to so shift the sprocket 81 as to disengage the hub 82 from the toothed collar 80, whereupon shaft 28 rotates freely without driving said sprocket 81.

The stub tongue and hitch assembly A will now be described in detail and reference is made more particularly to Figs. 8 and 9. 87 denotes the stub tongue pivoted at 88 to the front steering bar 18 and pivoted at 89 to the rear bar 19. This tongue 87 is provided with one longitudinal slot 90 between the bars 18—19 and with a second longitudinal slot 91 in advance of said bars. Disposed respectively over and under the tongue 87, are an upper longitudinal pull bar 92 and a lower pull bar 93. A horizontal plate 94 overlies the slotted rear portion of the tongue 87 and underlies the rear end of the pull bar 92. A bolt or other pivot 95 passes through this plate 94, through the slot 90 and through the rear ends of the bars 92—93. Another bolt or other pivot 96 passes through the front ends of the bars 92—93 and through the slot 91, and the rear end of a third pull bar 97 is loosely connected with the bolt or the like 96 so that it may freely swing vertically according to necessary relative movements between the tractor or horse-pull and the machine. To prevent lateral swinging of tractor-pull bar 97 with regard to the tongue 87, so that steering may be effected, I provide a vertically elongated guide 98 depending rigidly from the front end of the tongue 87, and extending rearwardly from the lower end of this guide, is a brace bar 99 whose rear end is anchored by the pivot 89. Preferably, the portions 87—98—99 are formed by bending a single bar as shown, portion 98 being slotted to receive the pull-bar 97. Two rearwardly diverging bars 100 are secured at their front ends to the plate 94 by bolts or the like 101. By similar fastenings 102, these bars are secured to the bottom bar 38 of the vertical frame V, and the rear extremities of said bars 100 are bolted or otherwise fastened at 103 to the side bars 34 of the main frame M. All pull on the tractor bar 97 or the horse evener is transmitted by the parts 96—92—93—95 to the plate 94 and all pull exerted upon the latter is transmitted by the bolts 101, the bars 100 and the fastenings 103, to the main frame M. There is thus no pull strain exerted upon the steering bars 18—19 and consequently no tendency to injure the latter. Whenever the pull-bar 97 or the horse tongue is horizontally swung in one direction or the other, it correspondingly swings the stub-tongue 87 and the latter turns about the bolt 95 as a pivot, moving bar 18 in one direction and bar 19 in the other direction, thereby turning the vertical shaft 16 and the spindles 15 to steer the wheels 14 in the proper way. It is during the swinging of the stub-tongue 87 that the slots 90—91 come into play.

In Fig. 12, some changes are shown over the construction previously described. The frame 50$^a$ corresponding to the frame 50, is forwardly extended as at 50$^b$ and is provided in advance of the angle bar 57$^a$ to which the braces 64 are secured, with a second transverse angle bar 57$^b$ to which braces 63$^a$ are secured, said braces 63$^a$ taking the place of the braces 63 above described. Suitable clamps or the like 51$^a$ are provided for securing the frame extension 50$^b$ to the bars 52.

Another change which Fig. 12 shows over the preceding figures, is the provision of a dual feed hopper 23$^a$ instead of the two hoppers 23. This hopper is provided with bottom 23$^b$ for guiding the seed to the seed-dropping means 24.

Also illustrated in Fig. 12, is the provision which is made for hitching horses to the stub-tongue 87. The upper reach of this stub-tongue is provided with a stirrup 87$^a$ which receives a bolt 97$^a$ passing through the rear ends of two metal bars or arms 97$^b$ which are secured to and project rearwardly from the horse-tongue 97$^c$, said bars or arms 97$^b$ straddling the vertical portion 98 of said stub-tongue 87.

It will be seen from the foregoing that I have made novel provision for carrying out the objects of the invention, and attention is again invited to the fact that within the scope of said invention as claimed, numerous variations may be made.

I claim:—

1. A seeding machine comprising a main wheeled frame provided with a rigid upstanding hopper-carrying frame, a transverse hopper fixedly mounted on said hopper-carrying frame and projecting laterally in both directions beyond said main frame, seed tubes embodying upper sections connected with the hopper and vertically movable lower sections carrying plows, some of said tubes being spaced outwardly from the longitudinal sides of said main frame, an auxiliary frame under said hopper-carrying frame and secured to said lower tube sections, said auxiliary frame overlying and projecting laterally in both directions beyond said main frame, upwardly projecting beams on said main frame for vertically guiding said auxiliary frame, and means mounted on said main frame and connected with said auxiliary frame for raising and lowering the latter.

2. A seeding machine comprising a main wheeled frame provided with fixed upstanding bars at its front end and with a fixed upstanding hopper-carrying frame behind said bars, a transverse hopper fixedly mounted upon said hopper-carrying frame, seed tubes embodying upper sections connected with the hopper and vertically movable lower sections carrying plows, an auxiliary frame secured to said lower tube sections and provided at its front end with guides which are vertically slidable upon the aforesaid upstanding bars of the main frame, and means mounted on said main frame and connected with said auxiliary frame for raising and lowering the latter.

3. In an agricultural machine, a structure as specified in claim 1; embodying rigid vertical legs rising from the main frame and partially supporting the hopper-carrying frame; said auxiliary frame having portions disposed in close proximity to said legs to prevent excessive lateral swaying of said auxiliary frame.

4. A structure as specified in claim 1; said main frame being provided with short rigid upstanding posts; said auxiliary frame being provided with portions disposed laterally of said posts and substantially in contact therewith when said auxiliary frame is lowered, thereby preventing lateral lashing of said auxiliary frame.

5. In an agricultural machine, a structure as specified in claim 1; said auxiliary frame embodying united bars disposed laterally and longitudinally above the side bars of the main frame; said hopper-carrying frame being provided with rigid legs secured to said side bars of the main frame, said legs being disposed laterally of a portion of said auxiliary frame and in close proximity thereto and serving to limit the lateral movement of the aforesaid bars of the auxiliary frame and therefore the lateral movement of the entire auxiliary frame when the latter is raised and lowered or manipulated in use.

6. In a seeding machine, a main frame adapted to be wheel-supported at its rear end and embodying longitudinal side bars having vertical bearings at their front ends, a transverse frame disposed in a vertical plane and secured at its lower portion to the front ends of said side bars, said transverse frame having vertical side bars, the upper corners of said transverse frame being provided with vertical bearings which together with those aforesaid are adapted to receive spindle-carried vertical shafts, transverse bars secured to said side bars of the main frame near the rear end of the latter, a hopper-carrying frame having front and rear supports secured to said transverse frame and the side and transverse bars of the main frame respectively; a seed tube carrying frame embodying lateral and longitudinal bars extending between said front transverse frame and rear supports with means on the front end of said seed tube carrying frame slidably engaging said vertical side bars of said transverse frame, and raising and lowering means mounted on said main frame and connected with the front and rear portions of said seed tube carrying frame.

7. In an agricultural machine embodying a main frame and a vertically movable frame; front and rear sets of cranks connected with the vertically movable frame for raising and lowering the latter, means pivotally mounting said front and rear sets of cranks on the main frame, each set of said cranks having alined shaft-receiving openings, a crank operating shaft passing through and removably secured in the openings of one set of said cranks, the openings of the other set being unoccupied, and means connecting the front and rear sets of cranks for movement in unison, all of said openings being of uniform size whereby said shaft may be secured in the openings of either the front or the rear cranks.

8. In a seeding machine, a seed discharge tube having an opening between its ends, a frame-carried seat member engaging said tube and having a stud received in said opening to hold the tube against vertical lateral or twisting movement, and means independent of said stud and opening for holding the tube engaged with the seat member.

9. In a seeding machine embodying front and rear lines or rows of seed dropping tubes and a frame adjacent said tubes; a dual-feed hopper mounted on said frame and having a bottom for directing seed forwardly to said front line or row of tubes and rearwardly to said rear line or row of tubes.

10. A seeding machine comprising a main wheeled and hopper-carrying frame provided with fixed upstanding bars at its front end and a transverse hopper fixedly mounted on said hopper-carrying frame behind said bars; plural transverse lines or rows of seed tubes embodying upper sections connected with the hopper and vertically movable lower sections carrying plows, an auxiliary frame construction secured to said lower tube sections and being provided at its front end with guides which are vertically slidable upon the aforesaid upstanding bars of the main frame, and means mounted on said main frame and connected with said auxiliary frame for raising and lowering the latter.

11. In a seeding machine, front and rear sets of seed-conducting tubes, the tubes of the two sets being relatively staggered, front and rear seed-dropping means at the upper ends of said front and rear sets of tubes, furrow-opening plows at the lower ends of all of said tubes, and a dual feed hopper having a bottom for directing seed to said front and to said rear seed-dropping means.

WILLIAM EVERSON.